Feb. 14, 1961 Y. MARTIN 2,971,831
MANUFACTURE OF SUPERPHOSPHATE
Filed May 2, 1957
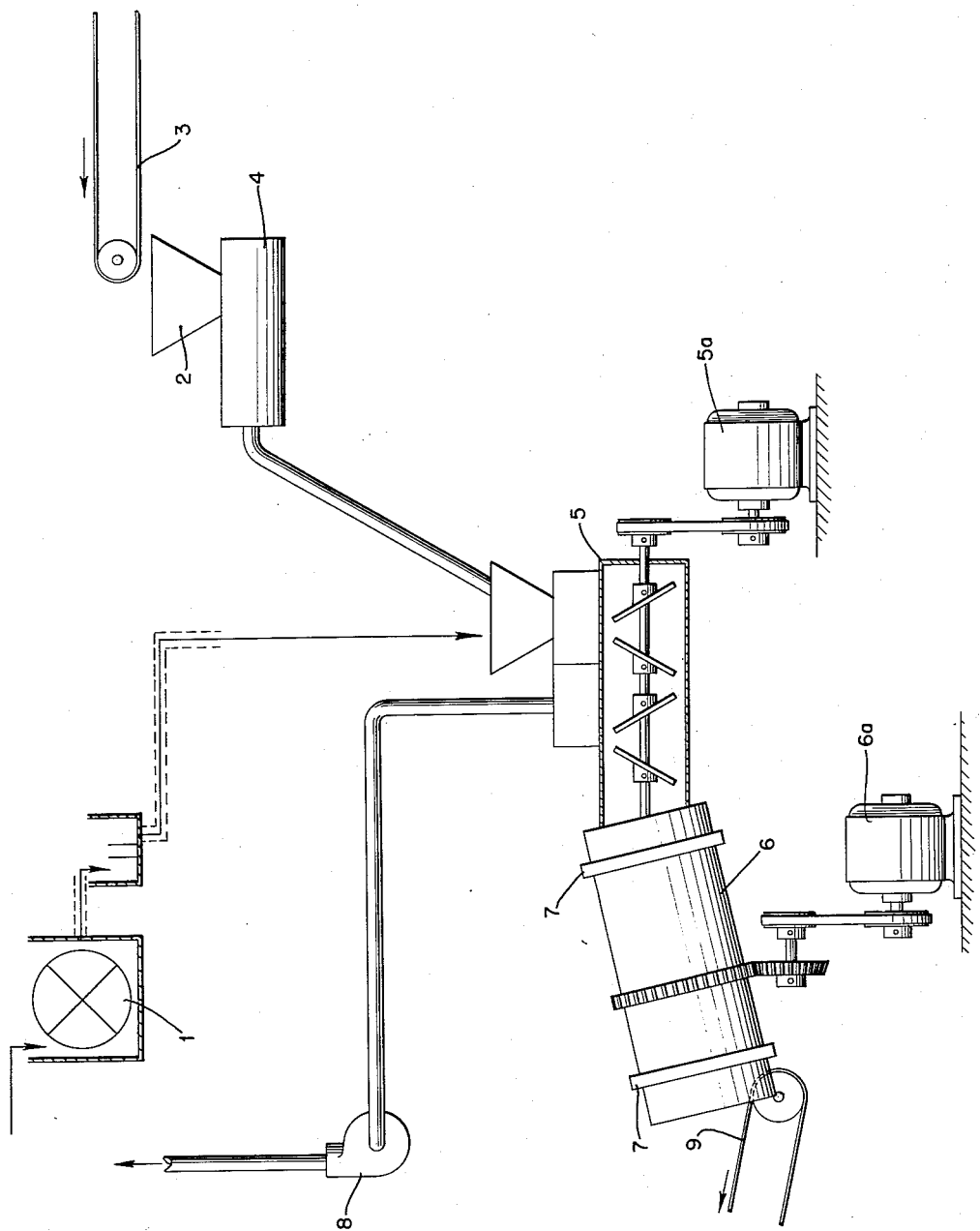
INVENTOR.
YVES MARTIN
BY
Bauer and Seymour
ATTORNEYS

United States Patent Office 2,971,831
Patented Feb. 14, 1961

2,971,831
MANUFACTURE OF SUPERPHOSPHATE

Yves Martin, Chauny, Aisne, France, assignor to Compagnie de Saint-Gobain, Paris, France Filed May 2, 1957, Ser. No. 656,725

Claims priority, application France May 7, 1956

3 Claims. (Cl. 71—40)

This invention relates to the manufacture of granulated superphosphate and constitutes an improvement over known processes.

It is known to manufacture superphosphate by using a rotary tube as a cave, the tube being slightly inclined on the horizontal line, receiving the mixed raw materials at one end and tumbling them and moving them toward the other end. The process is continuous and the larger part of the reaction of the raw phosphate with the sulphuric acid takes place in the tube. Nevertheless, up to the present invention, it has not been possible to obtain directly at the discharge end of the cave tube granules of fertilizer which are of those dimensions and of that hardness which are satisfactory for the fertilizer market. Therefore, in order to obtain such marketable superphosphate it has been proposed to associate a rotary cave tube with a second or even more rotary tubes which act as granulators and driers. That practice complicates apparatus and increases its cost and the cost of manufacture.

It is an object of this invention to produce in a single cave tube a granulated fertilizer having a high proportion of marketable sizes which are of that hardness which is acceptable to the trade and to do this without the addition of a granulating tube and without subsequent drying.

Superphosphate granules of marketable quality must be of the size demanded by the trade, for example, two to four millimeters in diameter and possessing, especially, a mechanical resistance sufficiently high and sufficiently enduring to resist the disintegration of the grains during packaging, transportation, storage, and handling in general. The hardness of 1,000 gr., as determined by the method hereinafter indicated, is considered satisfactory by the trade in most countries. The objects of the invention are accomplished generally speaking by mixing sulphuric acid and phosphate of fertilizer grade in a proportion producing at least 5% to 6% of the total $P_2O_5$ insoluble in ammoniacal citrate of ammonia after aging, moving and tumbling the mass, and cooling the mass to a temperature at the finish of the reaction below 80° C. The process involves introducing a stream of mixed sulphuric acid and raw phosphate into the rotating cave tube, the quantity of acid being chosen after the analysis of the composition of the phosphate to produce a superphosphate containing, after aging, at least 5% to 6% of $P_2O_5$ insoluble in ammoniacal citrate of ammonia based on the total $P_2O_5$, and to regulate the cooling of the exothermic reaction mass to produce a temperature less than 80° C. at the discharge end of the tube.

In this invention the sulphuric acid is used in an amount inferior to that generally employed in prior art processes, an amount which appears unfavorable to granulation because of the reduction in the liquid phase which it introduces into the processes. It is therefore astonishing that by thus reducing the liquid phase while lowering the temperature of the reaction in the tube satisfactory granulation and strength of grain should be attained. It has been found, however, that the tumbling mass remains in a pasty state favorable to granulation somewhat longer than in some prior art processes and quite long enough to enable the granulation to take place.

The effect of the particular quantity of sulphuric acid used in the new process is particularly efficacious in its effect on the hardness of the granules and in maintaining that hardness. These qualities are related to the content of $P_2O_5$ insoluble in citrate, which can exceed the minimum of 5% to 6% without inconvenience to the granulation and is unlimited except by the quality of assimilability desired in the product. The limitation of the temperature in the cave tube has a controlling effect on the quantity of granules of marketable size which will appear in the product issuing from the tube, so that it is possible to vary that proportion by changing the temperature: For example, if one wishes to obtain a part of the production as a powder in order to mix it with the other ingredients of a composite fertilizer.

We have established the fact that it is necessary to limit the temperature at which the superphosphate issues from the tube to 80° C. if granulation is to be successfully accomplished. The control of temperature in the rotating tube can be obtained by varying the intensity of a current of air which is blown through the tube, preferably countercurrent to the direction of motion of the stream of reaction mass and product. It is part of the invention thus to control the temperature of the reaction throughout the length of the tube, the only controls necessary being to determine the temperature of the product as it leaves the tube and to vary the flow of air through the tube so as to maintain that temperature below its established limit.

The accompanying drawing is a diagrammatic view of an apparatus adapted to carry out the new process. In this drawing the numeral 1 represents the sulphuric acid supply which supplies the acid at a regular rate to the apparatus, and 3 represents a conveyor which brings crude phosphate to an apparatus 4 which measures the quantities which are delivered to a mixer 5 together with the sulphuric acid. The reaction mass is driven by a conveyor means and a motor 5A into the receiving end of rotary cave tube 6 which is driven by a motor 6A so that the reaction mass is tumbled about therein. The tube is inclined so that the stream of reaction mass moves from the admittance to the discharge end where it is received by a belt 9 and carried away to be stored for aging. A blower 8 draws air through the tube counter-current to the flow of the reaction mass and serves to reduce the temperature of the mass so that at the discharge end it is below about 80° C. The blower can be regulated so as to vary the flow of air through the tube and the mixer.

The reaction mass moves through the tube and is tumbled about by its rotation. At discharge it can be treated as desired, for instance it may be accumulated in a body, or it can be delivered by the belt 9 to screens.

After being aged for fifteen days several products of the process were studied to determine the effect of the proportions of $P_2O_5$ which is insoluble in citrate on the granulating properties of the product. The following table shows the result of that work:

| Tests | No. 1 | No. 2 | No. 3 |
|---|---|---|---|
| Free $P_2O_5$ | 3 | 2.6 | 2.4 |
| Total $P_2O_5$ | 19.1 | 19.5 | 19.7 |
| Assimilable $P_2O_5$ | 18.4 | 18.4 | 18.3 |
| Insoluble $P_2O_5$ | 0.7 | 1.1 | 1.4 |
| Insoluble $P_2O_5$ as a percent of total $P_2O_5$ | 3.5 | 5.5 | 7 |
| $H_2O$ | 8.6 | 8.8 | 8.5 |
| Hardness, g. | 700 | 850 | 1,250 |

The hardness is measured by applying a cylindrical rod of 4 millimeters' diameter connected to a dynamometer. The test point was that indicated by the dynamometer when the rod crushed the granule. The results shown in the table above are the average of 20 granules selected by chance.

The following is an example of making granulated superphosphate by this invention and by means of an apparatus corresponding to that of the drawing.

Example

A rotary cave tube 12 meters long and 2.5 meters in diameter was turned at a speed of 1.5 turns per minute, which produced a peripheral speed on the order of 12 meters per minute. Into the mixer, as shown in the drawing, there was introduced 11,700 kg. of Moroccan phosphate containing 75% of tricalcium phosphate and 9,400 kg. of sulphuric acid of 55.5° Baumé and 30° C. The cave tube was inclined 4% from the horizontal.

A current of air was circulated through the tube so as to produce a temperature of the material at discharge of 72° C. The material took 30 minutes to pass through the tube.

The granular condition of the superphosphate thus produced was as follows: 30% by weight of granules having dimensions above 5 millimeters, 5% for dimensions below 1.5 millimeters and 65% having dimensions between 1.5 and 5 millimeters.

After aging for fifteen days the gross particles (larger than 5 millimeters) were crushed and screened and marketable sizes therefrom were added to the marketable size which issued from the rotary tube, thus producing a total of 80% of selected size capable of withstanding all of the tests mentioned hereinabove.

As many apparently widely different embodiments of the present invention may be made without departing from the spirit and scope thereof, it is to be understood that the invention is not limited to the specific embodiments.

What is claimed is:

1. A method of making superphosphate having a major proportion of granules between 1.5 and 5 mm. diameter that comprises admitting to a rotating cave tube a sludge of mixed sulfuric acid and phosphate of fertilizer grade containing proportions of the phosphate and acid producing at least 5-6% of total $P_2O_5$ insoluble in ammoniacal citrate of ammonia in the final product after aging, advancing and tumbling the reaction mass in the tube, passing cooling air countercurrent through the tube at a rate producing a reaction mass temperature less than 80° C. at the discharge end of the tube, and aging the product for a period of days to a hardness about 1,000 g.

2. The method of making superphosphate having a major proportion of granules between 1.5 and 5 mm. diameter that comprises mixing streams of sulphuric acid and phosphate of fertilizer grade in a proportion producing at least 5-6% of the total $P_2O_5$ insoluble in ammoniacal citrate of ammonia after aging, pouring the mixture into a rotating cave tube, thereby advancing and tumbling the mass, cooling the mass throughout the length of the tube to a temperature at the discharge end of the tube below 80° C. and aging the product for a period of days to a hardness minimum about 850 g.

3. The method of making superphosphate having a major proportion of granules of sizes between 1.5 and 5 mm. diameter and of marketable hardness that consists in its essential steps of pouring a sludge of sulphuric acid and phosphate of fertilizer grade, in a proportion producing at least 5.5% of total $P_2O_5$ insoluble in ammoniacal citrate of ammonia after aging, into a rotating cave tube, tumbling and advancing the mass in the tube for a time on the order of a half hour, cooling the mass by air flow to an end-of-tube temperature less than 80° C., and discharging and aging the product to a hardness between about 850 g. and 1250 g.

References Cited in the file of this patent

UNITED STATES PATENTS

| | | |
|---|---|---|
| 1,837,305 | Wight et al. | Dec. 22, 1931 |
| 2,136,793 | Gabeler et al. | Nov. 15, 1938 |
| 2,287,759 | Hardesty et al. | June 23, 1942 |
| 2,722,472 | Baron | Nov. 1, 1955 |
| 2,858,203 | Bellinzoni | Oct. 28, 1958 |
| 2,886,426 | Gera | May 12, 1959 |